United States Patent
Kubota et al.

(10) Patent No.: US 8,323,850 B2
(45) Date of Patent: Dec. 4, 2012

(54) DIRECT METHANOL FUEL CELL LIQUID FUEL WITH WATER AND METHANOL HAVING SPECIFIC ELECTRICAL RESISTANCE AND DIRECT METHANOL FUEL CELL CARTRIDGE

(75) Inventors: Makoto Kubota, Kawasaki (JP);
Motokazu Kobayashi, Yokohama (JP);
Shinji Eritate, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 62 days.

(21) Appl. No.: 12/766,443

(22) Filed: Apr. 23, 2010

(65) Prior Publication Data

US 2010/0203423 A1 Aug. 12, 2010

Related U.S. Application Data

(62) Division of application No. 11/252,602, filed on Oct. 19, 2005, now Pat. No. 7,892,665.

(30) Foreign Application Priority Data

Oct. 27, 2004 (JP) ................................. 2004-312711

(51) Int. Cl.
*H01M 8/22* (2006.01)

(52) U.S. Cl. ......... 429/502; 429/506; 429/515; 429/479

(58) Field of Classification Search .................. 429/502, 429/506, 505, 448, 454, 482, 479, 515; 44/451
See application file for complete search history.

(56) References Cited

U.S. PATENT DOCUMENTS

| | | | |
|---|---|---|---|
| 6,506,513 B1 | 1/2003 | Yonetsu et al. | |
| 2004/0224211 A1* | 11/2004 | Kamo et al. | 429/34 |
| 2005/0112417 A1 | 5/2005 | Oshima et al. | |
| 2005/0191199 A1* | 9/2005 | Date et al. | 419/2 |
| 2006/0068271 A1 | 3/2006 | Ren et al. | |

FOREIGN PATENT DOCUMENTS

| | | |
|---|---|---|
| JP | 11-339826 A | 12/1999 |
| JP | 2001-93551 A | 4/2001 |
| JP | 2004-164954 A | 6/2004 |

* cited by examiner

*Primary Examiner* — Raymond Alejandro
(74) *Attorney, Agent, or Firm* — Fitzpatrick, Cella, Harper & Scinto

(57) ABSTRACT

A direct methanol fuel cell liquid fuel including methanol and water to be supplied to an anode of a direct methanol fuel cell, in which an electrical resistance of the liquid fuel is $5\times10^5$ $\Omega\cdot cm$ or more and $1\times10^7$ $\Omega\cdot m$ or less at 25° C. A direct methanol fuel cell cartridge storing the direct methanol fuel cell liquid fuel, and a direct methanol fuel cell system. Such structures can provide a direct methanol fuel cell liquid fuel, a direct methanol fuel cell cartridge, and a direct methanol fuel cell system all appropriately used for stable electricity generation over a long period of time.

5 Claims, 1 Drawing Sheet

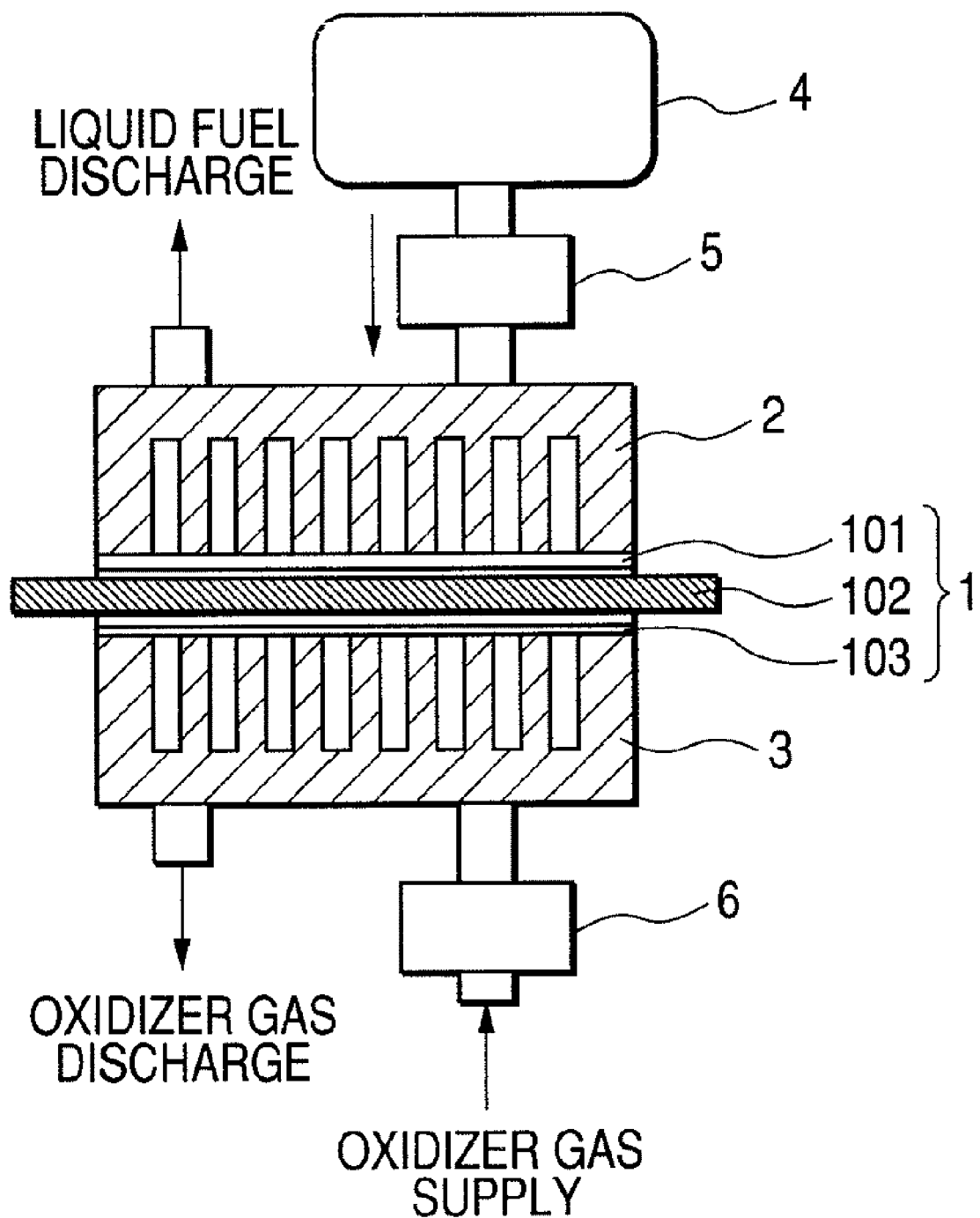

DIRECT METHANOL FUEL CELL LIQUID FUEL WITH WATER AND METHANOL HAVING SPECIFIC ELECTRICAL RESISTANCE AND DIRECT METHANOL FUEL CELL CARTRIDGE

CROSS-REFERENCE TO RELATED APPLICATION

This application is a division of application Ser. No. 11/252,602, filed Oct. 19, 2005, now U.S. Pat. No. 7,892,665, which is incorporated herein by reference.

BACKGROUND OF THE INVENTION

1. Field of the Invention

The present invention relates to a direct methanol fuel cell liquid fuel, to a direct methanol fuel cell cartridge using the liquid fuel of the present invention, and to a direct methanol fuel cell system using the liquid fuel of the present invention. The present invention more specifically relates to a direct methanol fuel cell liquid fuel, which has a reduced total content of components adversely affecting electricity generation efficiency for improving electricity generation performance of a fuel cell.

2. Related Background Art

A polymer electrolyte fuel cell generally has a layered structure in which a proton conductive polymer electrolyte membrane is held between an anode (fuel electrode) and a cathode (oxidizer electrode). The anode and the cathode are each composed of a mixture of: a catalyst having a noble metal such as platinum or an organometallic complex carried on conductive carbon; an electrolyte; and a binder. A fuel supplied to the anode passes through fine pores of the anode, reaches the catalyst, and releases electrons by the action of the catalyst to convert into hydrogen ions. The hydrogen ions pass through the electrolyte membrane provided between the electrodes, reach the cathode, and react with oxygen supplied to the cathode and electrons flowing from an external circuit into the cathode, to thereby produce water. The electrons released from the fuel pass through the catalyst and the conductive carbon carrying the catalyst in the anode, are guided to the external circuit, and flow into the cathode from the external circuit. As a result, in the external circuit, the electrons flow from the anode to the cathode such that electric power is taken out.

Of the fuel cells, a direct methanol fuel cell (DMFC) allowing electricity generation by mere direct supply of a liquid fuel containing methanol and water has particularly attracted attention because of its advantages such as easy and safe handling of the fuel, and simple fuel storage. Further, applications of the DMFC are expected in various fields such as portable electrical devices.

Japanese Patent Application Laid-Open No. 2001-93551 discloses that a fuel storage vessel for DMFC is formed of a removable vessel or a vessel that may be refilled with a liquid fuel, to thereby allow size reduction and long-term drive of a DMFC system.

However, in actual long-term drive of this kind of DMFC system, trace amounts of impurity components in an aqueous methanol solution to be supplied as a fuel accumulate in a fuel cell. The accumulation of the impurity components provides adverse effects such as deterioration of catalyst performance, thereby causing a problem in that an electromotive force of the fuel cell becomes unstable. The problem can be presumably solved by removing the impurity components in the liquid fuel in advance. However, which impurity components in the liquid fuel must be reduced to what extent are hitherto not known for realizing long-term stable drive of DMFC.

SUMMARY OF THE INVENTION

The inventors of the present invention have focused on components in a liquid fuel except methanol and water, and have repeated various analytical experiments. As a result, the inventors of the present invention have found that main impurity components in the liquid fuel include ketone components, aldehyde components, halogen components, and alkali metal components. Further, the inventors of the present invention have also found that the liquid fuel having the impurity components removed therefrom exhibits an electrical resistance within a specific range under normal temperatures.

In view of solving the above-mentioned problems, an object of the present invention is to provide a liquid fuel allowing stable long-term electricity generation by DMFC, a DMFC cartridge, and a DMFC system.

According to a first aspect of the present invention, a direct methanol fuel cell liquid fuel includes methanol and water to be supplied to an anode of a direct methanol fuel cell, in which an electrical resistance of the liquid fuel is $5 \times 10^5$ Ω·cm or more and $1 \times 10^7$ Ω·cm or less at 25° C.

A total content of components in the liquid fuel except methanol and water is preferably 10 ppm or less. A total content of ketone components and aldehyde components in the liquid fuel is preferably 5 ppm or less.

A total content of halogen components in the liquid fuel is preferably 1 ppm or less. A total content of alkali metal components in the liquid fuel is preferably 5 ppm or less.

According to a second aspect of the present invention, a direct methanol fuel cell cartridge stores the above-mentioned direct methanol fuel cell liquid fuel. According to a third aspect of the present invention, a direct methanol fuel cell system includes: (A) one of: a fuel cell unit including a proton conductive polymer electrolyte membrane held between an anode and a cathode, a passage for supplying a liquid fuel to the anode, and a passage for supplying an oxidizer gas to the cathode; and a fuel cell stack obtained by stacking a plurality of fuel cell units; and (B) a fuel cartridge storing the liquid fuel to be supplied to the anode, in which the liquid fuel is the above-mentioned direct methanol fuel cell liquid fuel.

A material for a member to be brought into contact with the liquid fuel preferably contains no components soluble in methanol or water.

The present invention can provide a direct methanol fuel cell liquid fuel, a direct methanol fuel cell cartridge, and a direct methanol fuel cell system all appropriately used for stable electricity generation over a long period of time.

Other features and advantages of the present invention will be apparent from the following description taken in conjunction with the accompanying drawings.

BRIEF DESCRIPTION OF THE DRAWINGS

FIGURE is a schematic diagram showing a structure of a direct methanol fuel cell system according to Example 4 of the present invention.

DESCRIPTION OF THE PREFERRED EMBODIMENTS

Hereinafter, embodiments of the present invention will be described in more detail.

(Characteristics of Liquid Fuel According to the Present Invention)

According to an embodiment of the present invention, a direct methanol fuel cell (DMFC) liquid fuel has an electrical resistance of $5 \times 10^5$ Ω·cm or more and $1 \times 10^7$ Ω·cm or less, preferably $1 \times 10^6$ Ω·cm or more and $1 \times 10^7$ Ω·cm or less at 25° C.

An electrical resistance of a liquid fuel substantially composed of an aqueous methanol solution only can be easily measured by using a commercially available general electrical conductivity meter such as SC-82 (manufactured by Yokogawa Electric Corporation) or DS-50 (manufactured by HORIBA, Ltd.). A DMFC liquid fuel having an electrical resistance of less than $5 \times 10^5$ Ω·cm due to impurities therein provides an adverse effect of reducing an electromotive force in long-term operation of the fuel cell. In contrast, a DMFC liquid fuel having an electrical resistance of more than $1 \times 10^7$ Ω·cm lacks components serving as a supply source of hydrogen ions and thus is not an appropriate DMFC liquid fuel.

According to another embodiment of the present invention, a DMFC liquid fuel has a total content of components except methanol and water of 10 ppm or less. Of the components in the liquid fuel, methanol and water are essential components for taking out electrons and hydrogen ions at the anode, and unconsumed methanol and water can be recovered. However, the components except methanol and water not only do not contribute to electricity generation but also may provide adverse effects such as reduction in electromotive force when the components accumulate within the fuel cell. Thus, the liquid fuel preferably contains the components except methanol and water of 10 ppm or less. The components except methanol and water of 10 ppm or less are considered to provide slight effects of reduction in electromotive force.

The components in the liquid fuel except methanol and water, which specifically contribute to reduction in electromotive force, include ketone components, aldehyde components, halogen components, and alkali metal components. Thus, according to still another embodiment of the present invention, a DMFC liquid fuel has a total content of ketone components and aldehyde components of 5 ppm or less, preferably 4 ppm or less. The ketone components according to the present invention refer to compounds of one kind or multiple kinds each having a ketone group in a structure. Similarly, the aldehyde components according to the present invention refer to compounds of one kind or multiple kinds each having an aldehyde group in a structure. Examples of the ketone components and the aldehyde components that may be actually included in the liquid fuel include acetone, acetaldehyde, and formaldehyde. The ketone components and the aldehyde components in the liquid fuel in a total content more of than 5 ppm adhere to catalysts in electrodes, to thereby cause a poisoning phenomenon and thus reduction in electromotive force of the fuel cell.

According to yet another embodiment of the present invention, a DMFC liquid fuel has a total content of halogen components of 1 ppm or less, preferably 0.5 ppm or less. The halogen components in the liquid fuel in a total content of more than 1 ppm adhere to porous electrodes, catalysts, a proton conductive polymer electrolyte membrane, and other various members, to thereby cause inactivation, corrosion, or the like and thus reduction in electromotive force of the fuel cell.

According to still yet another embodiment of the present invention, a DMFC liquid fuel has a total content of alkali metal components of 5 ppm or less, preferably 3 ppm or less. Examples of the alkali metal components that may be actually included in the liquid fuel include lithium, potassium, and sodium. Magnesium components may also be included in the liquid fuel, and a total content thereof is preferably reduced to about 5 ppm or less. The alkali metal components in the liquid fuel in a total content of more than 5 ppm adhere to the proton conductive polymer electrolyte membrane, to thereby increase internal resistance and thus reduction in electromotive force of the fuel cell.

Examples of a method of measuring contents of organic components such as ketone components or aldehyde components in the liquid fuel include: a quantitative analysis method (GC/MS-SIM) by using a gas chromatography/mass spectrometry apparatus with selective ion monitoring; and a combination of separation of the components through column chromatography represented by high performance liquid chromatography, and a compound specification method through IR, NMR, or the like.

Examples of a method of measuring contents of inorganic components such as alkali metal components or halogen components in the liquid fuel include: ion chromatography; emission spectrochemical analysis (ICP atomic emission spectrochemical analysis) utilizing inductively coupled plasma discharge; atomic absorption analysis; silver nitrate titration, ion selective electrode; and a combination thereof with ion chromatography.

Of various measurement methods, the contents of the components are measured through a quantitative determination method (GC/MS-SIM) and ion chromatography in the present invention. In the present invention, the contents of the components in the DMFC liquid fuel except methanol and water can be specified by combining the above-mentioned methods.

(Method of Producing Liquid Fuel According to the Present Invention)

A method known to a person skilled in the art may be used for the method of producing the DMFC liquid fuel according to the present invention containing as main components methanol and water. The present invention has features in electrical resistance of a DMFC liquid fuel and in contents of trace amounts of impurity components in the DMFC liquid fuel. Except those features, a composition, a production method, and the like of the DMFC liquid fuel are not particularly limited. However, in consideration of the fact that equimolar amounts of both methanol and water are consumed at the anode, an amount of water in the liquid fuel is preferably 40 wt % or more and 99 wt % or less.

In order to obtain a such high purity liquid fuel, impurity components must be removed from methanol and water as raw materials in advance through sufficient purification operations such as distillation, sublimation, and recrystallization, and then methanol and water must be mixed. Industrially used methanol generally contains about 30 ppm of acetone and acetaldehyde in total. Industrial water generally contains about 20 to 80 ppm each of components derived from chloride ions, potassium ions, and sodium ions. Purification methods of the raw materials are not particularly limited, and various examples thereof include distillation, use of an ion-exchange resin, and filter filtration. In order to achieve the purity required in the present invention, the purification operations are preferably repeated several times or combined.

(Direct Methanol Fuel Cell Cartridge According to the Present Invention)

The essence of the present invention is that the DMFC cartridge according to the present invention stores one of the direct methanol fuel cell liquid fuels of the present invention. A shape of the DMFC cartridge, a fuel supply method into the cartridge, a method of detaching and attaching the cartridge from and to a fuel cell main body, and the like are not particularly limited.

However, in the DMFC cartridge of the present invention, a material for a member to be brought into contact with the liquid fuel preferably contains no components soluble in methanol or water. Examples of the material for the member include a resin containing no plasticizer, a metal, and glass. In a case where the material for the member to be brought into contact with the liquid fuel contains components soluble in methanol or water, components eluted into the liquid fuel are mixed and accumulated in the fuel cell, to thereby reduce electromotive force.

In the present invention, the phrase "a material for the cartridge contains no components soluble in methanol or water" indicates that solubility of the material for the cartridge to methanol or water is 1 ppm or less, preferably 0.1 ppm or less.

(Direct Methanol Fuel Cell System According to the Present Invention)

The essence of the present invention is that the DMFC system according to the present invention uses one of the liquid fuels of the present invention. Kinds of members of the DMFC system, a structure of the system, and a production method for the system are not particularly limited.

However, in the DMFC system of the present invention, a material for a member to be brought into contact with the liquid fuel such as a material for an inner wall of a fuel cartridge or for a fuel passage preferably contains no components soluble in methanol or water. In a case where the material for the member to be brought into contact with the liquid fuel contains components soluble in methanol or water, components eluted into the liquid fuel are mixed and accumulated in the fuel cell, to thereby reduce electromotive force.

The fuel cartridge of the DMFC system of the present invention may employ the DMFC cartridge of the present invention. Alternatively, the fuel cartridge of the DMFC system of the present invention may have a function of injecting a liquid fuel from the DMFC cartridge of the present invention.

Hereinafter, the present invention will be described in more detail by way of examples, but the present invention is not limited to the examples without departing from the gist of the present invention.

Example 1

(Production Example of Direct Methanol Fuel Cell Liquid Fuel According to the Present Invention)

Commercially available first grade methanol was subjected to purification operation by using an ion-exchange resin once, filter filtration operation by using a reverse osmosis membrane (allowing compounds each having a molecular weight of 50 or less to pass therethrough) once, and purification operation through distillation under reduced pressure once.

Then, tap water was subjected to purification operation by using an ion-exchange resin three times, and purification operation through distillation under normal pressure twice. 5 parts by weight of purified methanol and 95 parts by weight of purified water were mixed, to thereby obtain a direct methanol fuel cell (DMFC) liquid fuel of the present invention.

The liquid fuel of the present invention had an electrical resistance of $2.5 \times 10^6$ $\Omega \cdot cm$ measured by using a conductivity meter (SC-82, manufactured by Yokogawa Electric Company). The liquid fuel had about 0.1 ppm of halogen components measured by using an ion chromatograph (IC500, manufactured by Yokogawa Electric Company). The liquid fuel had about 1 ppm of alkali metal components measured by similarly using an ion chromatograph. The liquid fuel had about 3 ppm of ketone components and aldehyde components in total measured by using GC/MS-SIM (5973N, manufactured by Agilent).

Example 2

(Production Example of Direct Methanol Fuel Cell Liquid Fuel According to the Present Invention)

Commercially available special grade methanol was subjected to filter filtration operation by using a reverse osmosis membrane (allowing compounds each having a molecular weight of 50 or less to pass therethrough) once, and purification operation through distillation under reduced pressure once.

Then, commercially available purified water for chemical experiments was subjected to purification operation by using an ion-exchange resin once, and purification operation through distillation under normal pressure once. 15 parts by weight of purified methanol and 85 parts by weight of purified water were mixed, to thereby obtain a direct methanol fuel cell (DMFC) liquid fuel of the present invention.

The liquid fuel of the present invention had an electrical resistance of $2.7 \times 10^6$ $\Omega \cdot cm$, and 0.1 ppm or less of halogen components. The liquid fuel had about 2 ppm of alkali metal components and about 4 ppm of ketone components and aldehyde components in total.

Example 3

(Production Example of Direct Methanol Fuel Cell Cartridge According to the Present Invention)

A vessel having an opening as a fuel supply port to an anode was formed of a propylene resin, and a polyester sponge member impregnated with the DMFC liquid fuel described in Example 1 was placed therein, to thereby obtain a DMFC cartridge of the present invention. The cartridge was left standing for 1 month, and then the liquid fuel inside the cartridge was recovered. The recovered liquid fuel was analyzed in the same manner as in Example 1, resulting in similar contents of the components except methanol and water.

Example 4

(Production Example of Direct Methanol Fuel Cell System According to the Present Invention)

A DMFC system having a structure shown in FIGURE was produced. A membrane electrode assembly (MEA) 1 serving as an electricity generation part of the DMFC system of Example 4 was provided with: an anode 101; a cathode 103; and a proton conductive polymer electrolyte membrane 102 arranged between the anode 101 and the cathode 103. In Example 4, "Nafion 112" (perfluorosulfonic acid membrane, available from DuPont) was used as the proton conductive polymer electrolyte membrane 102. Further, an anode passage plate 2 for supplying the liquid fuel to MEA 1 was provided on a side of the anode 101. A fuel cartridge 4 storing the DMFC liquid fuel of the present invention was connected to the anode passage plate 2 through a liquid supply pump 5.

In Example 4, the DMFC liquid fuel produced in Example 1 was stored in the fuel cartridge 4. Meanwhile, a cathode passage plate 3 for supplying an oxidizer gas to MEA 1 was provided on a side of the cathode 103. A gas supply pump 6 was connected to the cathode passage plate 3. MEA 1 was heated by a heater (not shown).

A production example of MEA 1 is described below in more detail. 4 g of conductive carbon (IEPC40A-II, available from ISHIFUKU Metal Industry Co., Ltd.) carrying a catalyst (40 wt % Pt −20 wt % Ru) was mixed with 10 g of ion-exchanged water and 8 g of a 5% Nafion solution (available from Wako Pure Chemical Industries, Ltd.), to thereby obtain a paste. The paste was applied on a surface of "Nafion 112", and the whole was dried. An amount of a Pt—Ru alloy applied was about 4 mg/cm$^2$.

Next, carbon paper (TGP-H-060, available from Toray Industries, Inc.) having a thickness of 0.2 mm was attached to the applied surface of "Nafion 112", and the whole was subjected to pressing, to thereby obtain MEA 1 of Example 4. An area of MEA 1 involved in electricity generation was 25 cm$^2$.

In the DMFC system, the liquid fuel was supplied from the fuel cartridge 4 to the anode passage plate 2 through the liquid supply pump 5, and passed through grooves of the passage plate. In Example 4, a liquid supply tube from the fuel cartridge 4 to the anode passage plate 2 was formed of a polypropylene resin. A stainless steel member was used as a connecting part between the fuel cartridge 4 and the liquid supply tube.

Comparative Example 1

(Production Example of Direct Methanol Fuel Cell System for Comparison)

5 parts by weight of commercially available first grade methanol (available from Kishida Chemical Co., Ltd.) and 95 parts by weight of tap water (Tokyo) were mixed, to thereby obtain a liquid fuel for comparison.

The liquid fuel had an electrical resistance of 6.6×10$^3$ Ω·cm through conductivity measurement. The liquid fuel had about 1.5 ppm of halogen components, and about 20 ppm of alkali metal components through ion chromatography measurement. The liquid fuel had about 30 ppm of ketone components and aldehyde components in total through a GC/MS-SIM method.

A DMFC system for comparison was produced in the same manner as in Example 4 except that the liquid fuel for comparison was stored in the fuel cartridge 4 shown in FIGURE. The DMFC system of the present invention produced in Example 4 and the DMFC system produced in Comparative Example 1 were each subjected to electricity generation testing for 720 hours in total. Table 1 shows open circuit voltages (electromotive force when current is not taken out) of each of the DMFC systems before and after the testing.

TABLE 1

Open circuit voltage of DMFC systems

|  | Initial open circuit voltage | Open circuit voltage after 720 hours |
|---|---|---|
| Example 3 | 0.90 V | 0.89 V |
| Comparative Example 1 | 0.88 V | 0.52 V |

Table 1 shows that no significant deterioration of open circuit voltage was observed in the DMFC system of the present invention, but electromotive force of the DMFC system for comparison reduced with time. The difference is presumably caused by the components in each of the liquid fuels.

The present invention is described above by way of examples, but the present invention is not particularly limited to purification methods for raw materials or materials forming the cartridge or the system.

The present invention can provide a direct methanol fuel cell liquid fuel, a direct methanol fuel cell cartridge, and a direct methanol fuel cell system all appropriately used for stable electricity generation over a long period of time.

This application claims priority from Japanese Patent Application No. 2004-312711 filed Oct. 27, 2004, which is hereby incorporated by reference herein.

What is claimed is:

1. A direct methanol fuel cell cartridge assembled in a direct methanol fuel cell, which stores a direct methanol fuel cell liquid fuel containing methanol and water supplied to an anode of the direct methanol fuel cell, wherein the liquid fuel has an electrical resistance of 5×10$^5$ Ω·cm to 1×10$^7$ Ω·cm at 25° C.,
wherein a material for all members in the fuel cell cartridge in direct contact with the liquid fuel is made of only a resin containing no plasticizer, a metal, or glass.

2. The direct methanol fuel cell cartridge according to claim 1, wherein a total content of components in the liquid fuel except methanol and water is from 4.1 ppm to 10 ppm.

3. The direct methanol fuel cell cartridge according to claim 1, wherein a total content of ketone components and aldehyde components in the liquid fuel is from 3 ppm to 5 ppm.

4. The direct methanol fuel cell cartridge according to claim 1, wherein a total content of halogen components in the liquid fuel is from 0.1 ppm to 1 ppm.

5. The direct methanol fuel cell cartridge according to claim 1, wherein a total content of alkali metal components in the liquid fuel is from 1 ppm to 5 ppm.

* * * * *